(12) United States Patent
Bar-Sade et al.

(10) Patent No.: US 8,711,888 B2
(45) Date of Patent: Apr. 29, 2014

(54) DIGITAL MICROWAVE RADIO LINK WITH ADAPTIVE DATA RATE

(75) Inventors: Idan Bar-Sade, Sunnyvale, CA (US); Eliezer Pasternak, Palo Alto, CA (US); Bin Zhang, Fremont, CA (US); Gregg Levin, Los Altos, CA (US)

(73) Assignee: REMEC Broadband Wireless LLC, San Diego, CA (US)

( * ) Notice: Subject to any disclaimer, the term of this patent is extended or adjusted under 35 U.S.C. 154(b) by 1175 days.

(21) Appl. No.: 11/322,972

(22) Filed: Dec. 30, 2005

(65) Prior Publication Data

US 2007/0153726 A1 Jul. 5, 2007

(51) Int. Cl.
*H04J 3/02* (2006.01)

(52) U.S. Cl.
USPC .......................................................... 370/538

(58) Field of Classification Search
USPC ......................... 370/538, 539, 540
See application file for complete search history.

(56) References Cited

U.S. PATENT DOCUMENTS

| | | | |
|---|---|---|---|
| 4,123,716 A | 10/1978 | Borg | |
| 4,186,344 A | 1/1980 | Higuchi et al. | |
| 4,232,318 A | 11/1980 | Becker et al. | |
| 4,520,474 A | 5/1985 | Vilmur | |
| 4,847,873 A | 7/1989 | Kuwaoka et al. | |
| 4,868,516 A | 9/1989 | Henderson et al. | |
| 5,010,405 A | 4/1991 | Schreiber et al. | |
| 5,036,299 A | 7/1991 | Dick et al. | |
| 5,241,566 A | 8/1993 | Jackson | |
| 5,274,449 A | 12/1993 | Keesen | |
| 5,325,401 A | 6/1994 | Halik et al. | |
| 5,349,644 A | 9/1994 | Massey et al. | |
| 5,387,939 A | 2/1995 | Naimpally | |
| 5,436,930 A | 7/1995 | Bremer et al. | |
| 5,440,585 A | 8/1995 | Partridge, III | |
| 5,446,762 A | 8/1995 | Ohba et al. | |
| 5,448,555 A | 9/1995 | Bremer et al. | |
| 5,463,660 A | 10/1995 | Fukasawa et al. | |
| 5,526,172 A | 6/1996 | Kanack | |
| 5,537,436 A | 7/1996 | Bottoms et al. | |
| 5,537,441 A | 7/1996 | Bremer et al. | |
| 5,608,263 A | 3/1997 | Drayton et al. | |
| 5,789,988 A * | 8/1998 | Sasaki ............................ 331/25 |
| 5,821,836 A | 10/1998 | Katehi et al. | |
| 5,844,944 A | 12/1998 | Betts et al. | |
| 5,859,877 A | 1/1999 | Betts et al. | |
| 5,881,047 A | 3/1999 | Bremer et al. | |
| 5,907,560 A | 5/1999 | Spruyt | |

(Continued)

FOREIGN PATENT DOCUMENTS

| | | |
|---|---|---|
| EP | 1 303 067 | 4/2004 |
| WO | WO 96/24225 | 8/1996 |
| WO | WO 99/62225 | 12/1999 |

OTHER PUBLICATIONS

10/100/1000Mbps Ethernet MAC with protocol Acceleration, MAC-NET Core with Avalon Interface, Product Brief, Version 1.0—Feb. 2004.*

(Continued)

*Primary Examiner* — Mark Rinehart
*Assistant Examiner* — Mohammad Anwar
(74) *Attorney, Agent, or Firm* — DLA Piper LLP (US)

(57) ABSTRACT

A digital microwave link and system are provided that has an adaptive data rate.

33 Claims, 9 Drawing Sheets

(56) References Cited

U.S. PATENT DOCUMENTS

| | | | |
|---|---|---|---|
| 5,956,373 | A | 9/1999 | Goldston et al. |
| 5,959,516 | A | 9/1999 | Chang et al. |
| 6,005,894 | A | 12/1999 | Kumar |
| 6,018,644 | A | 1/2000 | Minarik |
| 6,028,885 | A | 2/2000 | Minarik et al. |
| 6,028,933 | A | 2/2000 | Heer et al. |
| 6,034,990 | A | 3/2000 | Kang |
| 6,094,102 | A | 7/2000 | Chang et al. |
| 6,127,908 | A | 10/2000 | Bozler et al. |
| 6,150,901 | A | 11/2000 | Auken |
| 6,151,354 | A | 11/2000 | Abbey |
| 6,157,679 | A | 12/2000 | Johnson |
| 6,172,378 | B1 | 1/2001 | Hull et al. |
| 6,215,789 | B1 | 4/2001 | Keenan et al. |
| 6,232,847 | B1 | 5/2001 | Marcy et al. |
| 6,265,948 | B1 | 7/2001 | Stevenson |
| 6,282,248 | B1 | 8/2001 | Farrow et al. |
| 6,330,236 | B1 | 12/2001 | Ofek et al. |
| 6,359,938 | B1 | 3/2002 | Keevill et al. |
| 6,483,814 | B1 | 11/2002 | Hsu et al. |
| 6,496,519 | B1 | 12/2002 | Russell et al. |
| 6,539,031 | B1 | 3/2003 | Ngoc et al. |
| 6,556,836 | B2* | 4/2003 | Lovberg et al. ............... 455/505 |
| 6,567,473 | B1 | 5/2003 | Tzannes |
| 6,718,491 | B1* | 4/2004 | Walker et al. ................. 714/701 |
| 6,741,643 | B1 | 5/2004 | McGibney |
| 6,798,784 | B2 | 9/2004 | Dove et al. |
| 6,853,261 | B1 | 2/2005 | Ling |
| 6,879,663 | B2 | 4/2005 | Fox |
| 6,907,048 | B1 | 6/2005 | Treadaway et al. |
| 6,925,113 | B2 | 8/2005 | Kim et al. |
| 6,937,456 | B2 | 8/2005 | Pasternak |
| 6,937,666 | B2 | 8/2005 | Pasternak |
| 6,973,141 | B1 | 12/2005 | Isaksen et al. |
| 7,002,941 | B1 | 2/2006 | Treadaway et al. |
| 7,010,728 | B2 | 3/2006 | Adam et al. |
| 7,010,738 | B2 | 3/2006 | Morioka et al. |
| 7,055,039 | B2 | 5/2006 | Chavanne et al. |
| 7,065,326 | B2* | 6/2006 | Lovberg et al. ................. 455/77 |
| 7,103,279 | B1 | 9/2006 | Koh et al. |
| 7,133,423 | B1 | 11/2006 | Chow et al. |
| 7,142,564 | B1 | 11/2006 | Parruck et al. |
| 7,184,466 | B1 | 2/2007 | Seemann et al. |
| 7,200,336 | B2* | 4/2007 | Yu et al. ........................ 398/135 |
| 7,205,911 | B2* | 4/2007 | Kim et al. ....................... 341/58 |
| 7,245,633 | B1 | 7/2007 | Mueller |
| 7,280,609 | B2 | 10/2007 | Dottling et al. |
| 7,283,844 | B2* | 10/2007 | Thompson ................. 455/562.1 |
| 7,324,600 | B2 | 1/2008 | Pauli et al. |
| 7,359,407 | B1* | 4/2008 | Mattos et al. .................. 370/509 |
| 7,392,092 | B2* | 6/2008 | Li et al. ........................... 607/60 |
| 7,392,279 | B1* | 6/2008 | Chandran et al. ............ 709/200 |
| 7,424,058 | B1 | 9/2008 | Staley et al. |
| 7,457,947 | B2 | 11/2008 | Carr |
| 7,529,215 | B2 | 5/2009 | Osterling |
| 7,564,908 | B2 | 7/2009 | Luz et al. |
| 7,627,023 | B1 | 12/2009 | Lo |
| 7,688,806 | B2* | 3/2010 | Shore et al. ................... 370/352 |
| 7,715,419 | B2 | 5/2010 | Tatar et al. |
| 7,751,372 | B2* | 7/2010 | Monsen ........................ 370/335 |
| 7,752,430 | B2 | 7/2010 | Dzung |
| 7,930,543 | B2 | 4/2011 | Corndorf |
| 8,041,233 | B2 | 10/2011 | Hueda et al. |
| 2002/0015206 | A1 | 2/2002 | Hakimi et al. |
| 2002/0021720 | A1 | 2/2002 | Seto et al. |
| 2002/0044651 | A1 | 4/2002 | Tuvell |
| 2002/0046276 | A1 | 4/2002 | Coffey et al. |
| 2002/0067755 | A1 | 6/2002 | Perkins |
| 2002/0111158 | A1 | 8/2002 | Tee |
| 2002/0122503 | A1 | 9/2002 | Agazzi |
| 2002/0129379 | A1 | 9/2002 | Levinson et al. |
| 2002/0164951 | A1* | 11/2002 | Slaughter et al. ............... 455/39 |
| 2002/0176139 | A1 | 11/2002 | Slaughter et al. |
| 2002/0193067 | A1 | 12/2002 | Cowley et al. |
| 2003/0035430 | A1 | 2/2003 | Islam et al. |
| 2003/0076787 | A1* | 4/2003 | Katz et al. ..................... 370/252 |
| 2003/0081700 | A1 | 5/2003 | Birru |
| 2003/0110509 | A1 | 6/2003 | Levinson et al. |
| 2003/0154495 | A1 | 8/2003 | Sage |
| 2003/0179771 | A1 | 9/2003 | Chan et al. |
| 2004/0028164 | A1 | 2/2004 | Jiang et al. |
| 2004/0033079 | A1 | 2/2004 | Sheth et al. |
| 2004/0120418 | A1 | 6/2004 | Pasternak |
| 2004/0127158 | A1* | 7/2004 | Dai et al. ...................... 455/12.1 |
| 2004/0136711 | A1 | 7/2004 | Finan et al. |
| 2004/0208243 | A1 | 10/2004 | Feher |
| 2005/0058150 | A1* | 3/2005 | Boles et al. ................... 370/445 |
| 2005/0075078 | A1 | 4/2005 | Makinen et al. |
| 2005/0088991 | A1 | 4/2005 | Kil |
| 2005/0196119 | A1 | 9/2005 | Popovic et al. |
| 2006/0050870 | A1 | 3/2006 | Kimmel et al. |
| 2006/0056620 | A1 | 3/2006 | Shingal et al. |
| 2006/0084406 | A1* | 4/2006 | Strachan et al. .............. 455/334 |
| 2006/0171714 | A1 | 8/2006 | Dove |
| 2006/0264210 | A1 | 11/2006 | Lovberg et al. |
| 2007/0014395 | A1 | 1/2007 | Joshi et al. |
| 2007/0153726 | A1 | 7/2007 | Bar-Sade et al. |
| 2010/0034385 | A1 | 2/2010 | Gantman |
| 2011/0013911 | A1 | 1/2011 | Alexander et al. |

OTHER PUBLICATIONS

PCT/US2006/046856 International Search Report, dated Nov. 28, 2008.
PCT/US2006/046856 Written Opinion, dated Nov. 28, 2008.
S. Bryant, G. Swallow, L. Martini, D. McPherson; Pseudowire Emulation Edge to Edge Control Word for Use over an MPLS PSN; RFC 4385; Feb. 2006.
William Stallings; Gigabit Ethernet; The Internet Protocol Journal—vol. 2, No. 3; Sep. 1999.
PCT International Search Report of PCT/US08/08491; dated Oct. 6, 2008.
PCT Written Opinion of PCT/US08/08491; dated Oct. 6, 2008.
Housley & Corry, "GigaBeam Radio Link Encryption", Oct. 2006, 14 pages.
Federal Information Processing Standards Publication 197, Advanced Encryption Standard (AES):, Nov. 26, 2001, 47 pages.
Federal Information Processing Standards Publication 140-2, Security Requirements for Cryptographic Modules:, May 25, 2001, 61 pages.
Morris, Dworkin, "Recommendation for Block Cipher Modes of Operation, Methods and Techniques, Computer Security", National Institute of Standard and Technology (NIST) Special Publication 800-38A, 2001 Edition, Dec. 2001, 59 Pages.
PCT International Search Report of PCT/US10/61929; dated Apr. 25, 2011.
PCT Written Opinion of PCT/US10/61929; dated Apr. 25, 2011.
European Search Report of EP 06 845 016; dated Jun. 14, 2011.
Schreiber et al. "A Compatible High-Definition Television System Using the Noise-Margin Method of Hiding Enhancement Information"; dated Dec. 1989.
Muldavine et al. "30 GHz Tuned MEMS Switches"; dated Jun. 1999.
Feng et al. "Design and Modeling of RF MEMS Tunable Capacitors Using Electro-thermal Actuators"; dated Jun. 1999.
Kim et al. "Millimeter-wave Micromachined Tunable Filters"; dated Jun. 1999.
Nguyen et al. "Micromachined Devices for Wireless Communications"; dated Aug. 1998.
Yao et al. "High Tuning-Ration MEMS-Based Tunable Capacitors for RF Communications Applications"; dated Jun. 8, 1998.
Biryukov "Block Ciphers and Stream Ciphers: The State of the Art"; dated Aug. 27, 2012.
PCT International Preliminary Report on Patentability of PCT/US08/08491; dated Jan. 12, 2010.
PCT International Preliminary Report on Patentability of PCT/US06/46856; dated Nov. 9, 2010.
PCT International Preliminary Report on Patentability of PCT/US10/61929; dated Jul. 10, 2012.
IEEE Standard for Information technology—Telecommunications and information exchange between systems—Local and metropolitan area networks—Specific requirements; dated Jun. 12, 2007.

* cited by examiner

DIGITAL MICROWAVE RADIO LINK WITH ADAPTIVE DATA RATE

FIELD OF THE INVENTION

This invention relates generally to the fields of microwave digital radio transmission and Ethernet Switching.

BACKGROUND OF THE INVENTION

In digital communication links over a channel subject to fading or interference, it is quite common to include multiple bit rates and to change the bit rate based on the current channel conditions. One common example is a telephone-line dial-up modem. The baud rate is determined by the instant telephone line performance. If the line condition worsens, the service is interrupted and a new bit rate is negotiated. It is desired to provide similar capabilities to digital microwave links operating at speeds of 1 gigabit/sec and beyond at frequencies above 10 GHz. In addition, since those links may carry high speed information critical to a business operation, the down time should be kept to minimum and it is desired to reduce the bit rate when a link deteriorates before service outage, and to switch back to higher speed automatically whenever the link condition allows. Furthermore, it is desirable to perform such rate switching with minimum loss of data. Wireless links at these speeds and these frequencies require rate adaptation solutions that respond to the rain fading characteristics of the link and to the required fast switching response time, as solution available for lower frequencies and lower bit rates are inadequate or to costly to implement.

Digital microwave radio links offer an alternative to fiber-optics and other land-based transmission lines whenever the land-based link is not feasible for cost, time or right-of-access reason or simply as an emergency backup when land-based links fail. The Ethernet hierarchy, currently Fast Ethernet (FE) with a throughput of about 100 megabits/sec and Gigabit Ethernet with a throughput of about 1 gigabit/Sec (GigE), is a very popular standard for interfacing such digital links. Higher speed Ethernet of about 2.5 gigabits/sec and 10 gigabits/sec are currently at an early phase of adoption. Digital wireless links may be subject to interference from other communication equipment, however chances of interference decrease with frequency, especially if highly directional antennas are used. On the other hand, higher frequency links, especially above 10 GHz, are subject to increasing rain fading. These trade-offs are especially noticeable at millimeter-wave frequencies. Two popular bands are the V-Band (around 59-66 GHz) and E-band (around 75-86 GHz). The V-band is license-free in the USA and several other countries, while the E-band is licensed with required frequency coordination. In both bands, the antenna beam-width can be maintained below 2 degrees, thus interference is highly unlikely, yet rain fading is quite significant. The range of a point-to-point link is determined in each geographical area based on the rain intensity statistics and the link's available fade margin. Typical industry accepted availability is 99.9% to 99.999% and a typical range at this availability is between 0.5 km-5 km.

Reducing the data rate can increase the range of a millimeter wave link, under fade-margin constraints, however the economical value of slower links decreases too. An acceptable compromise is to offer an adaptive-rate link, such as a GigE-link that reduces speed to FE under a strong rain fade. The link range may be determined so as to provide an availability of at least 99.99% with FE and at least 99.9% with GigE. It is desirable to provide such rate-adaptation with a minimum, or even no, interruption to service and to perform the rate switching without user intervention. Furthermore, if the Ethernet hierarchy is used, it is desirable to take advantage of available low-cost Ethernet chip-sets to minimize the cost of such rate-adaptive links, because the Ethernet protocols and the available chip-sets include rate adaptation functionality.

Some of the aspects of a digital millimeter wave radio link have been disclosed U.S. Pat. No. 6,937,666 which is assigned to the same assignee as the present application. The radio disclosed in the '666 Patent can provide further background information regarding millimeter wave digital radio links and their application.

When microwave links, especially in the millimeter bands, are used for implementing the backbone network of a campus or even metropolitan-area, it is desirable to offer drop/insert capabilities and Ethernet-based network-element management ports directly in the radio enclosure. Such implementation offers network flexibility by offering multiple services and cost reduction in equipment, installation and maintenance and improved service reliability.

A system and method that provides an adaptive rate digital microwave communications link and drop/insert capabilities is desirable and it is to this end that the present invention is directed.

SUMMARY OF THE INVENTION

A digital microwave communications system and method are provided that provides an adaptive rate and has drop/insert capabilities. The system includes a microwave link consisting of at least two radio transceiver terminals with an integral Ethernet Switch function located in each terminal. The integrated Ethernet switch supports at least two Ethernet bit rates, such as fast Ethernet (FE) at rates up to 100 megabits per second, Gigabit Ethernet (GigE) at rates up to 1000 megabits per second (1 gigabit per second) and/or 10 GigE at rates up to 10 gigabits per second. The terminal of the system may include a radio portion and a digital portion. The radio includes multiple Ethernet I/O ports. The microwave link can be used as a single-hop Ethernet repeater or as a chain of multiple links with the ability of each link to drop/insert local Ethernet traffic by using the integral Ethernet switch and relay other traffic by daisy-chaining co-located radio terminals using other Ethernet ports in the radio built-in switch.

Any data traffic from local Ethernet ports and optionally a built-in network management system agent (that generates overhead bits) are combined into a transmit payload and are delivered to a transmit modulator as a bit stream including the traffic and overhead bits. The overhead bits are used for the purposes of forward error correction, framing and link-signaling. The microwave transmitter includes a modulator capable of changing the transmitted bit rate to the current aggregate bit rate. The modulator delivers a modulated signal containing the aggregate bit stream to the microwave radio that includes amplifiers, up-converters, filters to generate a transmit radio-frequency signal at an antenna port that is part of the radio. The system may be implemented with various different modulation schemes, such as frequency shift keying (FSK) or phase shift keying (PSK), and the actual modulation scheme used for an implementation depends on the particular radio design. In the preferred embodiment of this invention, any modulation scheme can be chosen as long as the link margin increases with reduction of the aggregate bit rate.

An antenna of the radio radiates a microwave signal towards the radio terminal at the opposite end of the link. The microwave receiver in each terminal includes a demodulator capable of demodulating at least two of all the transmitted bit rates. The receiver further includes circuits and processing circuits for monitoring and estimating the receive link quality. While the receiver demodulates at a slower bit rate, the expected signal quality of the higher bit rate is measured and if the quality is acceptable, the link transitions to a higher bit rate transmission.

The digital portion of each terminal may include state machines to minimize the bit rate switching time. The state machines monitor the link performance and generate control signals to the system components when a rate change is desired. The operation of these state machines includes a process for switching the transmit rate at the opposite side of the link based on locally received signal quality, including the steps of signaling a change request to the opposite link using the overhead bits of the transmitted bit stream and causing the opposite link to switch rates upon reception of a request signal. Once the new rate is received properly, the local receive circuitry is configured by the state machine to change to the new rate and the local Ethernet switch receives the signal at the electrical interface suitable for this rate. The Ethernet switch directs the received traffic to any destination automatically based on the payload Ethernet address, thus the switching is essentially instantaneous.

Ethernet bit-sequences known as special code words are used over the air to provide frame-synchronization, signaling and payload delineation. By providing standard Ethernet word formats for delineating the over-the-air transmission signals, the receiver can use low-cost Ethernet-compatible components to distinguish these code words and perform the synchronization and delineation functions cost-effectively.

Thus, in accordance with the invention, a rate-adaptive digital microwave radio terminal is provided. The terminal comprises a digital data portion that is capable of handling two different data rates and a radio frequency portion, coupled to the digital data portion, that operates at frequencies above 10 GHz wherein the radio frequency portion has transmission modes that handle the two different data rates. The two data rates are a first data rate of at least 1 gigabit/second and a second data rate that is less than 1 gigabit/second.

In accordance with another aspect of the invention, a rate-adapting microwave communication link is provided that comprises a first microwave terminal that is capable of transmitting a signal at one of a first data rate and a second data rate and a second microwave terminal that is capable of transmitting a signal at one of a first data rate and a second data rate. The first microwave terminal has a receive performance-level monitoring circuit that generates a signal indicating a performance level of a received signal from the second microwave terminal, a logic circuit coupled to the receive performance-level estimation circuit that compares the performance level to a threshold level and a circuit that generates a signal to request a transmit rate change in the second microwave terminal based on the comparison of the performance level and the threshold level.

In accordance with yet another aspect of the invention, a digital microwave radio terminal is provided that has a digital data portion and a radio frequency portion, coupled to the digital data portion, that operates at frequencies above 10 GHz. The terminal also has an Ethernet switch, coupled to the digital data portion and the radio frequency portion, that is integral to the digital microwave radio terminal.

In accordance with yet another aspect of the invention, a method for communicating Ethernet data between a first microwave terminal and a second microwave terminal over a microwave link is provided. In the method, a digital data signal having a particular data rate is received at the first microwave terminal and digital data signal is switched, using an Ethernet switch that is part of the first microwave terminal, to a transmission link path. The first microwave terminal then generates a transmission bitstream from the digital data signal wherein the transmission bitstream has one or more special Ethernet code words embedded into the bitstream. The first microwave terminal then generates a modulated signal at a dual rate modulator based on the particular data rate of the digital data signal and sends a microwave signal containing the modulated signal over a microwave link to the second microwave terminal.

In accordance with yet another aspect of the invention, a process of changing the transmit rate in a microwave link between a first microwave terminal and a second microwave terminal is provided wherein the first and second microwave terminals are capable of transmitting a microwave signal at one of a first data rate and a second data rate. To change the data rate, the first microwave terminal, generates a received bitstream from a microwave signal received by the first microwave terminal. The first microwave terminal then monitors the received bitstream in order to generate a signal indicating a performance level of the received microwave signal from the second microwave terminal, compares the performance level of the received microwave signal to a threshold level and generates a rate change request signal that requests a data rate change for the microwave link between the first and second data rates.

DETAILED DESCRIPTION OF A PREFERRED EMBODIMENT

The invention is particularly applicable to a communications system that is implemented as described below and it is in this context that the invention will be described. It will be appreciated, however, that the system and method in accordance with the invention has greater utility since the various elements of the system may be implemented in other known ways that are within the scope of the invention.

Figure 1:
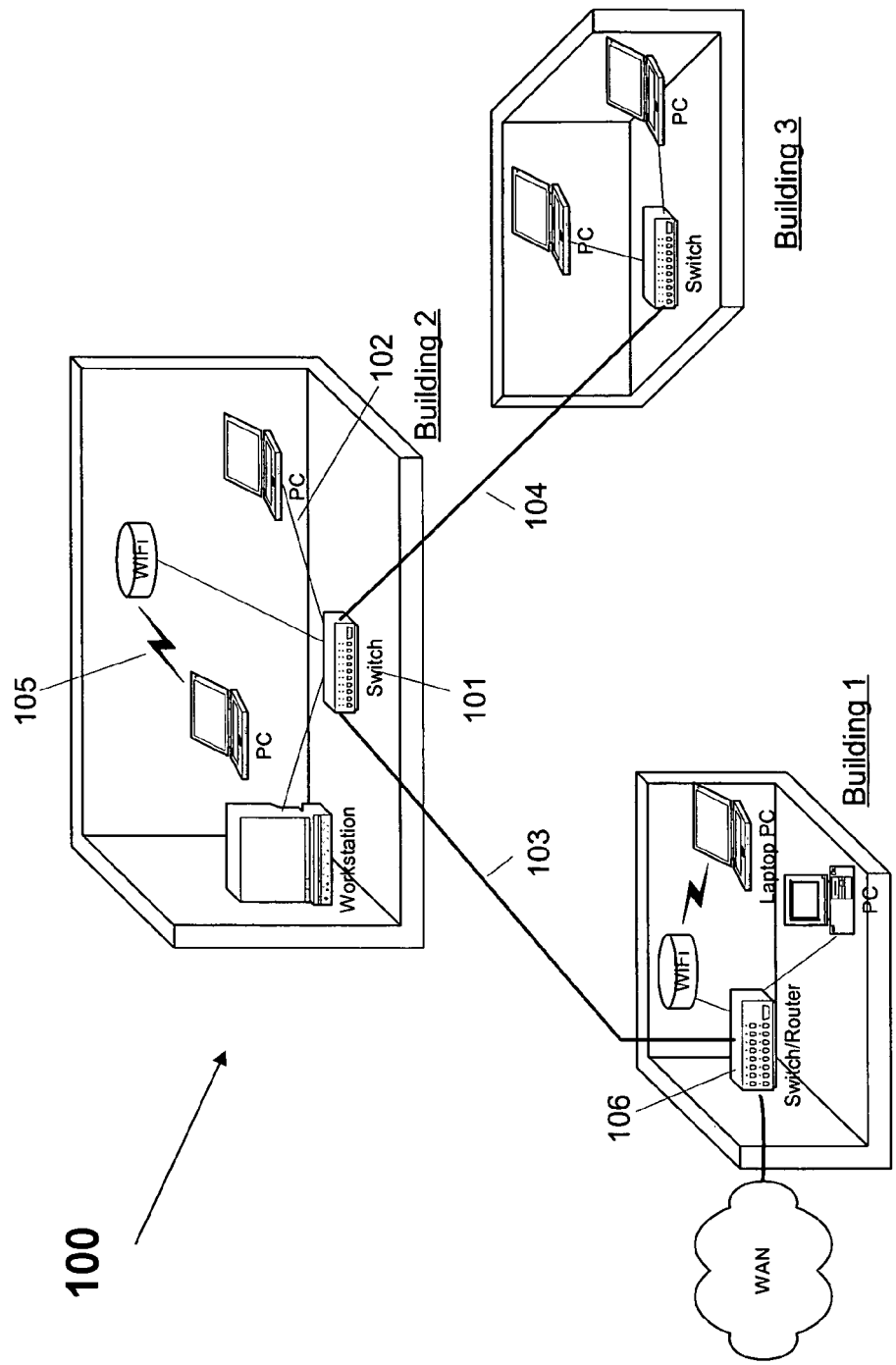
FIG. 1 illustrates a communications system that may be implemented using the system of the present invention.

FIG. 1 shows a communications system 100 that may be implemented using the system of the present invention. In the system 100, digital millimeter wave radio links may replace fiber-optics links typically used on campuses and within cities to interconnect buildings such as the buildings shown. An Ethernet switch 101 is connected to other pieces of computer-related equipment, such as a workstation, personal computers (PC) and/or a wireless access point (WiFi), via local connections such as the link 102 wherein the link 102 may be wired or wireless. The switch 101 may also be coupled to other buildings via a physical media link 103 and a physical media link 104, typically requiring GigE or higher speeds. The system in accordance with the invention replaces each of the inter-building links 103 and 104 with microwave links so that the communications system 100 has the same topology except that the links 103, 104 are microwave links. The indoor Ethernet connections are typically served by copper cables, fiber optics or wireless WiFi links 105. In accordance with the invention, the switch 101 shown in FIG. 1 can be replaced by the Ethernet switching circuitry and function of the terminals of the system shown in FIGS. 2-8. However, since cabling is often more expensive than Ethernet switch ports, a more likely scenario is to leave the switch 101 indoors and to perform the traffic switching of the lines 103 and 104 by the radio switching capabilities of the system. As illustrated above, the present invention is a flexible add-on to the variety of existing solutions available for Ethernet networking. A connection to the wide area network at these rates is also likely to be Ethernet based, while the carried traffic over this Ethernet link is usually Internet-compatible (TCP/IP). Now, an example of a communications network using the terminals of the system are described.

Figure 2:
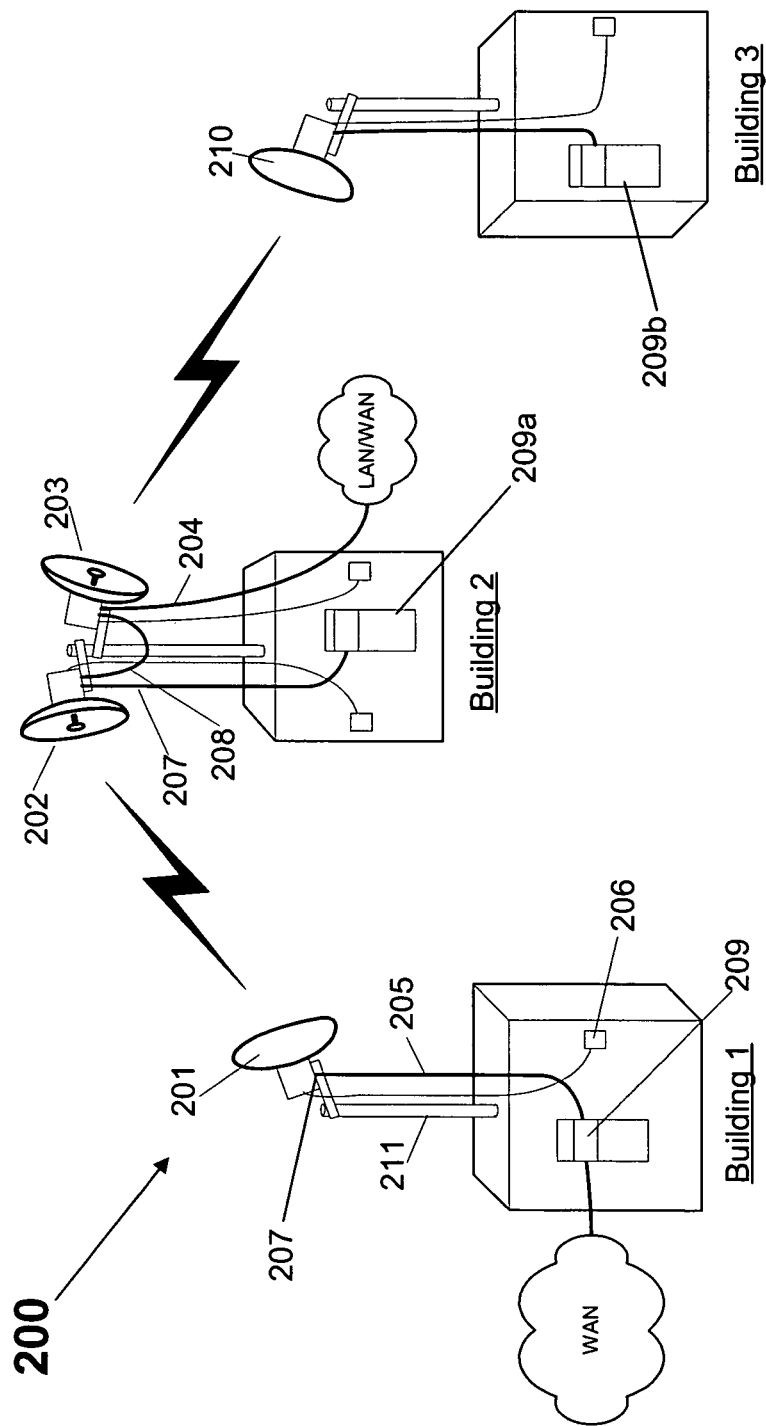
FIG. 2 illustrates an example of an implementation of one or more terminals of a communication system in accordance with the invention wherein each terminal has a microwave radio link with wireless Ethernet communications and Ethernet drop/insert capability.

FIG. 2 shows an example of an implementation of one or more terminals of a communication system 200 in accordance with the invention wherein each terminal has a microwave radio link with wireless Ethernet communications and Ethernet drop/insert capability. In this example, the communication system is used to interconnect one or more building (such as Building 1, Building 2 and Building 3.) The system may have a first radio terminal 201 and a second radio terminal 202 that provide the equivalent connectivity and service of the link 103 shown in FIG. 1. A piece of indoor equipment 209 can be identical to the switch/router 106 shown in FIG. 1, and an Ethernet fiber channel/cable 205 can be identical and serve the same function as the cable 103. The system in accordance with the invention may also include an AC/DC power adaptor 206 connected by a DC cable 217 to the terminal 201 to provide power to the terminal 201. As shown in FIG. 2, the system 200 may further include first and second collocated terminals 202, 203 and a terminal 210 at the third building. In the exemplary communication system, the indoor equipment 209 of the first building may be connected to a data network, such as a wide area network and then also connected to the terminal 201 by a link 205. The second building may have the collocated terminals 202, 203 wherein a piece of indoor equipment 209a may be connected to the first terminal 202 by a cable and the terminals 202, 203 may be interconnected by a link 208. The second terminal 203 may be connected to a network, such as a local area network or wide area network, by a link 204. In the third building, the terminal 210 is connected to a piece of indoor equipment 209b by a link 207a. Each link 205, 207, 208, 204, 207a may preferably be an Ethernet fiber channel/cable.

Other than the AC/DC power adaptor and the DC cable at each building, the communication system 200 does not require any indoor LAN equipment in addition to the equipment shown in FIG. 1 that is already present. However, the communication system 200 does implement a major change of the data traffic flow pattern. Since both co-located radio terminals 202 and 203 contain Ethernet switches, the traffic from Building 1 to Building 3 is relayed direct via the fiber optics cable 208 directly to the radio 203 and then via the wireless link to the radio terminal 210. Any traffic bound to Building 2 travels down the cable 207. Thus the wireless links between terminals 201 to 202 and 203 to 210 and the cable 208 form a backbone path, while the cable 207 is a drop/insert connection for local traffic to the second building. Thus, the communication system with the terminals form a data backbone path as well as the drop/insert connection. As one skilled in the art appreciates, the communication system 200 shown in FIG. 2 is merely illustrative and other communication systems with different topologies may be created using the terminals and these other communication systems are within the scope of the invention.

The flexibility obtained by using integral Ethernet switches in the terminals 201, 202, 203 and 210 enable the implementation of broadband services to multiple buildings (as shown in FIG. 2) without fiber optics connections between them and/or provides an emergency backup to fiber-optics links. The poles holding the radios, such as the pole 211 on Building 1, can be replaced by telephone/electric utility poles or light poles which can provide the operating electric power to the radios. In accordance with the invention, the high-speed links between poles can be the wireless radios and the local drop/insert traffic can be switched internally in the radio 202 as described above. In the communication system 200, any radio Ethernet port can be connected arbitrarily to a part of the extended LAN or WAN hierarchy, such as illustrated with the cable 204. It is also possible to mount some or all of the terminals 201, 202, 203 and 210 indoors wherein the terminal located indoors is aligned to an opposite terminal at another building via a glass window or a microwave-transparent radome.

Figure 3:
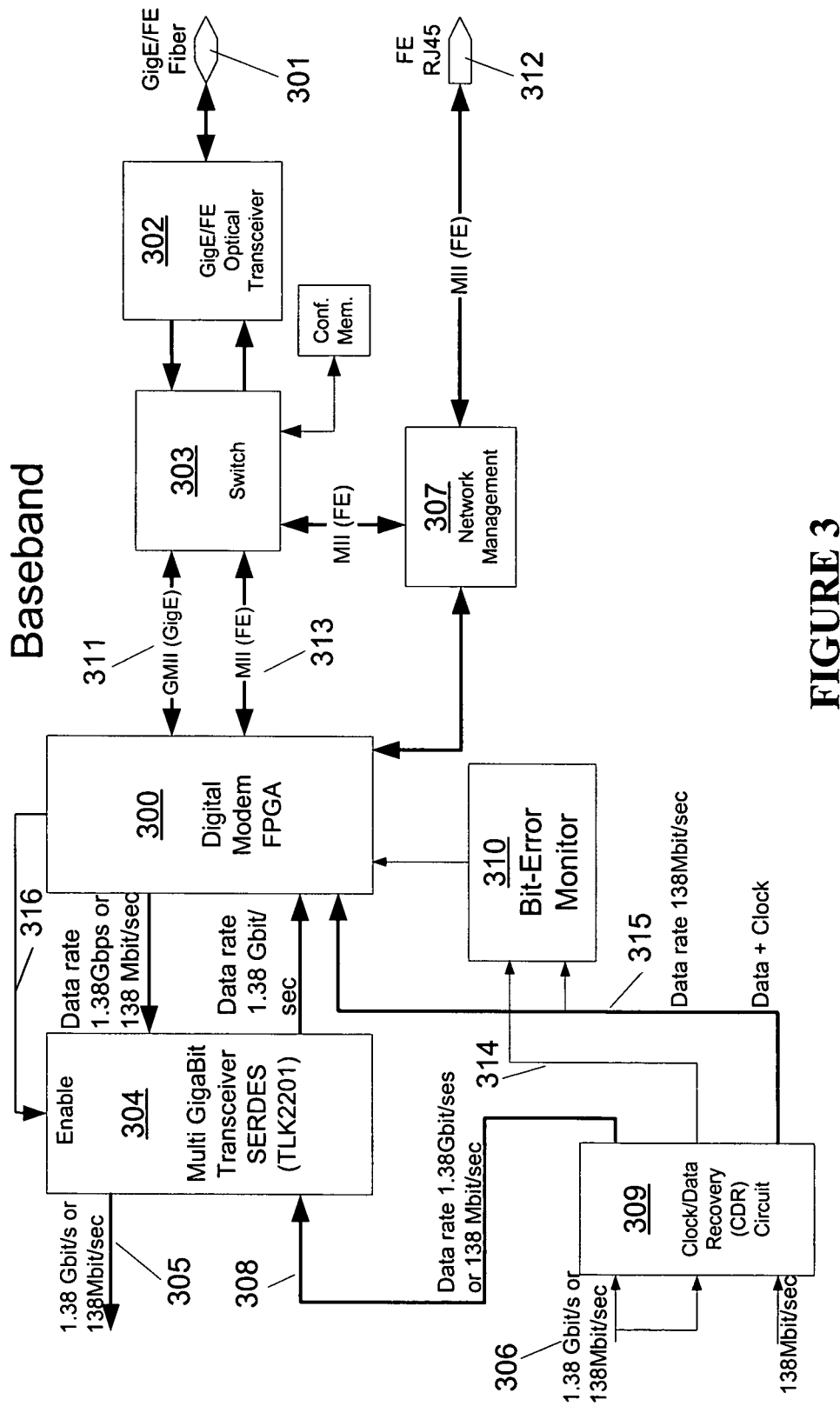
FIG. 3 illustrates an example of a digital data and baseband portion of the terminal shown in FIG. 2.
Figure 4:
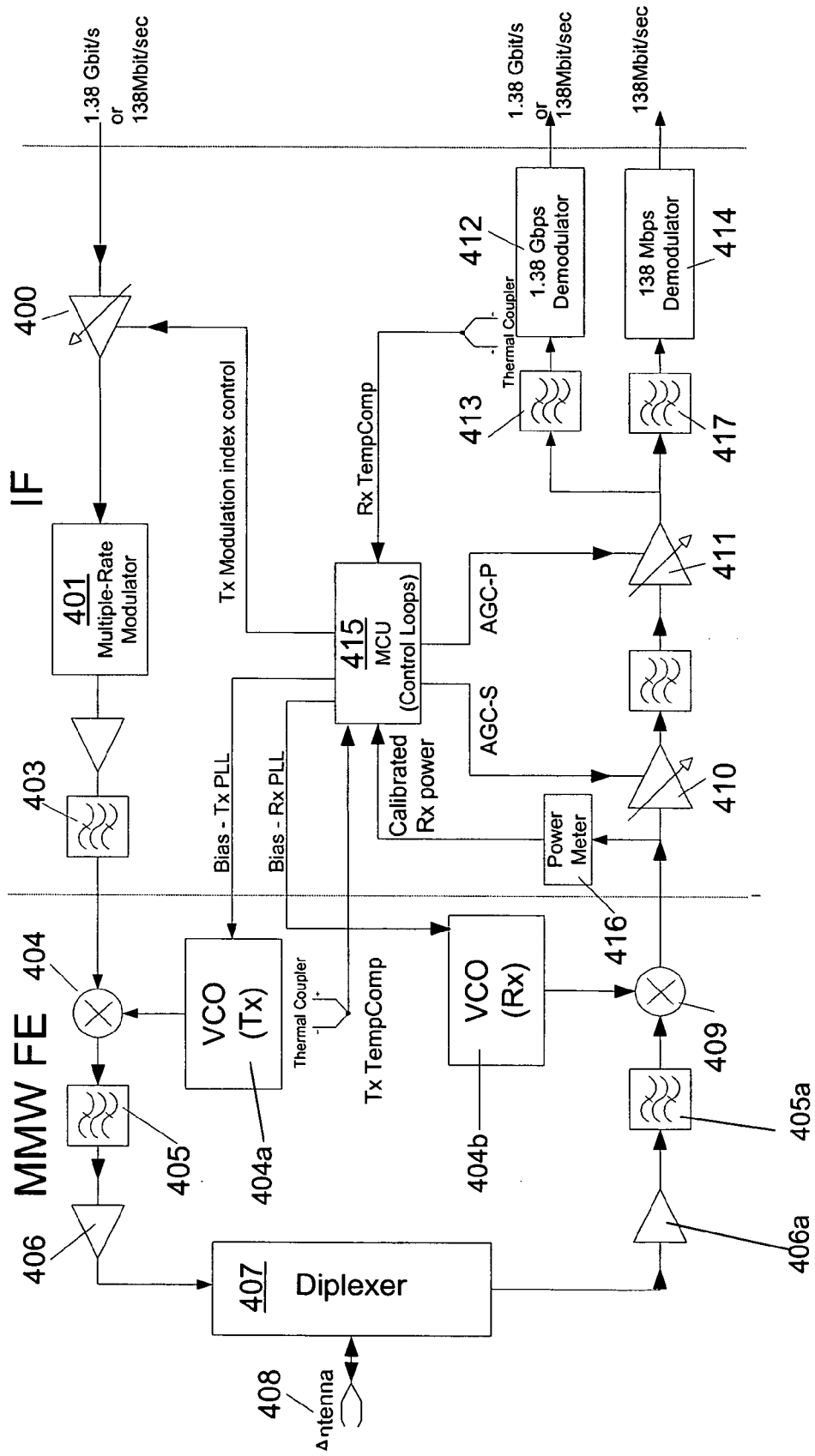
FIG. 4 illustrates an example of an intermediate frequency and radio frequency portion of the terminal of FIG. 2.

Each terminal of the communication system consists of an enclosure with enclosed electronic circuitry and external interfaces for power and Ethernet ports, mounting/alignment hardware and an antenna. The mechanical structure of such a terminal is well known in the art of digital radios and is not described further herein. An electrical block diagram of a preferred embodiment of each terminal is shown in FIGS. 3 and 4 wherein FIG. 3 illustrates an example of the digital and baseband circuitry of the terminal and FIG. 4 illustrates the intermediate frequency and radio frequency portions of the terminal. In the preferred embodiment, most of the digital processing is implemented by a field programmable gate array (FPGA), an application specific integrated circuit (ASIC) or any other logic circuit which is shown in FIG. 3 as the digital modem FPGA 300. The digital processing functions are also delegated to other components when the FPGA cannot handle the speed or when complex functions are available cost effectively by off-the-shelf integrated circuits. For example, the terminal may include an Ethernet switch 303, a well known serializer/deserializer (SERDES) transceiver 304 (such as the TLK2201 integrated circuit) that converts parallel data used by the FPGA (at 1.38 Gbps) to a serial high-speed interface 305 and 308 with the intermediate frequency/radio frequency (IF/RF) sections shown in FIG. 4, a Clock/Data Recovery (CDR) device 309 that recovers the clock frequency from the signals from the IR/RF section and an optional Network Management Processor 307. The processor 307 may include the entire protocol stack needed to implement the agent functions of network-element management, including Ethernet, TCP/IP, HTML server and SNMP. The terminal may also include an external interface 301 that provides the connection with external Ethernet systems via fiber optic or copper-based cables. While only one GigE interface 301 is shown, multiple interfaces are within the scope of the invention and those interfaces can be added with each connected to another port in the switch 303. If fiber optic interfaces are used in the terminal, a transceiver 302 converts the fiber signals (optical) at either the GigE or FE speed into electrical signals wherein the converted optical signals are fed into the switch 303 and the converted electrical signals from the switch 303 and output over the fiber optic interface.

The transmit/receive data path within the exemplary circuit in FIGS. 3 and 4 will now be described. First, the data path for a signal to be transmitted by the radio over a wireless link (known as the transmit data path) will be described. Then, the data path for a signal received by the radio over the wireless link and sent over the Ethernet interfaces (known as the receive data path) will be described. For the transmit data path, one or more outside Ethernet frames from the port 301 arrive as electrical signals at the switch 303 via the transceiver 302. The switch 303 performs all relevant Ethernet switching functions in a well known manner that will not be described further herein. For example, the switch 303 may be implemented using an off-the-shelf integrated circuit such as an 88E6095 made by Marvell Semiconductor, Inc. of Sunnyvale, Calif. Optionally, a router-layer can be provided above the Ethernet function, allowing for IP-level routing services, however the preferred embodiment uses Ethernet switching for cost effectiveness reasons. The switch 303 delivers each Ethernet frame to its destination port based on the frame's MAC address. The Ethernet frames destined for the radio link are passed through an active port 311 or 313. The port 311 is a Gigabit Media Independent Interface (GMII), Ethernet standard for passing the Ethernet frame MAC "payload", without the Ethernet Physical Layer code words overhead. The port 313 is a Media Independent Interface operating at the fast Ethernet speed. The choice between the ports 311 and 313 depends on the current active radio channel bit rate since the terminal provides an adaptive data rate depending on the link quality. The selection of the port 311 or 313 is described in more detail below with reference to FIGS. 5-8.

Returning to the transmit data path, the FPGA 300 receives the MAC packet from the active port 311 or 313 and adds proprietary overhead bits to format the packet for transmission over the air as described below with reference to FIGS. 5A and 5B. The proprietary air interface bit stream is delivered from the FPGA 300 as a parallel word to the SERDES 304 that converts the bitstream into a serial bit stream 305 that is sent to a multiple rate modulator 401 (shown in FIG. 4) via an optional gain controlled amplifier 400 (also shown in FIG. 4). The modulator 401 is designed to transmit at both the GigE speed of 1.38 Gbps (with overhead), or the corresponding FE speed of 138 Mbps (with overhead). The radio front-end transmit chain preferably may include a filter 403, a mixer 404 (that mixes a signal from a transmit voltage controller oscillator 404a fed by a bias signal from an MCU 415), a radio frequency filter 405, an RF power amplifier 406 and a diplexer 407, connected to an antenna 408 via a waveguide port so that a radio frequency signal corresponding to the Ethernet frames are transmitted over the wireless link via the antenna 408. The millimeter-wave radio front-end architecture shown is a typical heterodyne full-duplex Frequency Division Duplex structure; however, any radio structure that can transmit the output of the signal generated by the modulator 401 can be used so that any radio that meets the above requirements is within the scope of the invention and the invention is not limited to the radio structure shown in FIG. 4.

A preferred modulation scheme for the radio is a constant envelope quadrature phase shift keying (QPSK), but other schemes can be used by the radio of the terminal, including BPSK and FSK. While each of these modulation schemes requires a different modem implementation and a different symbol-synchronization technique, those different modem implementations and symbol-synchronization techniques (not shown in FIG. 4 or described in detail herein) are within the scope of the invention since those techniques and implementations are well known to radio communications engineers skilled in the art.

For the receive data path, radio signals received at the antenna 408 may be amplified by the RF power amplifier 406a, filtered by a filter 405a, down-converted by a mixer 409 (that mixes a signal from a receive voltage controller oscillator 404b fed by a bias signal from an MCU 415) to an intermediate frequency (IF) and are delivered via gain-controlled amplifiers 410 and 411 to two filters and demodulators operating in parallel. A first demodulator 412 operates at 1.38 Gbps via an IF filter 413 suited for the signal bandwidth at this rate, approximately 1.5 GHz for QPSK, and a second demodulator 414 via a filter 417 operates at 138 Mbps, about 150 MHz for QPSK. The 10:1 ratio of bandwidth of the two filters 413 and 417 causes a 10:1 signal to noise ratio advantage from the FE transmission at 138 Mbps. When the antenna 408 receives a signal at 1.38 Gbps, only the modulator 412 can provide valid output. On the other hand, when the antenna 408 receives a 138 Mbps signal, both demodulators 412 and 414 might be able to deliver a valid 138 Mbps output signal. Since the IF filter 413 has higher bandwidth, the demodulator 412 can deliver low-error-ratio output while an FE signal is received only when the radio channel fading condition has improved to allow for reception of the 1.38 Gbps signal, thus the demodulator 412 performance can be monitored in accordance with the invention during transmission of either bit rate to determine the radio channel fading condition.

The two-demodulator outputs (at 1.38 Gbps or 138 Mbps) 306 are delivered to the Clock-Data-Recovery (CDR) circuit 309 (shown in FIG. 3). The circuit 309 includes multiple CDR functions, and is available commercially from Mindspeed technologies, Inc. of Newport Beach, Calif. The demodulator 412 output 306 is connected to two CDR ports. The data and clock recovered from one of these ports goes to the SERDES 304 via a data bus 308, while the other output 314 goes to a bit-error monitor circuit 310 to be discussed below. The SERDES 304 converts the data from serial to parallel and delivers the parallel traffic to the FPGA 300. The FPGA 300 performs the radio signal frame synchronization and error correction and finally delivers the recovered Ethernet MAC payload to the switch 303. The switch 303 builds Ethernet frames containing the MAC payload and delivers the frames to the appropriate switch-port. If the frame is destined to the fiber output 301, the switch 302 outputs this frame to the port 301 via the transceiver 302 to convert the electrical signal into an optical signal.

A microcontroller (MCU) 415 (shown in FIG. 4) controls and configures the various system components, including temperature compensation of various RF/IF components, gain control of amplifiers, FPGA setup, frequency control (AFC or PLL) and any other desired control functions. FIG. 4 shows some sensing and control lines (Rx TempComp, AGC-S, AGC-P, Tx Modulation index control, etc.) connected to the MCU 415, however many other control lines exist in the circuit shown in FIG. 4 which would be well known to one of ordinary skill in the art (and are within the scope of the invention), but those liens are not shown in order to provide clarity to the diagrams shown.

Figures 5A, 5B:
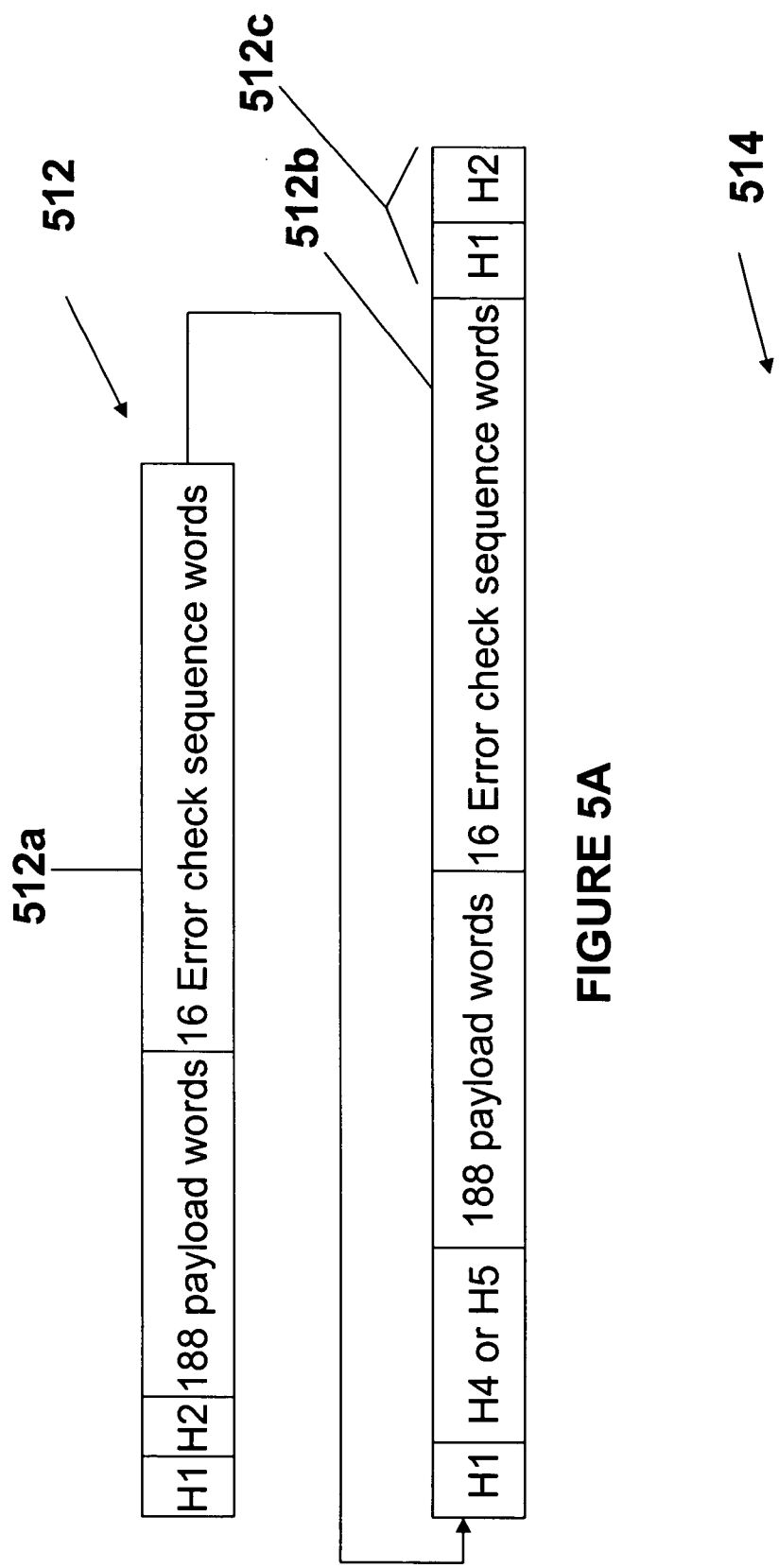
FIG. 5A illustrates an example of a frame structure 512 for the communication system in accordance with the invention.
FIG. 5B illustrates an example of the payload 514 of the frame structure of FIG. 5A.

FIG. 5A illustrates an example of a frame structure 512 for the communication system in accordance with the invention. In particular, the frame structure for the wireless transmission, referred below as "air interface", contains Special Ethernet-compatible code words. Each air-interface word is 10-bits long. Some are reserved code words that do not appear in the payload field and the rest represent data bytes converted to 10-bit words by the 8B/10B Ethernet standard encoding scheme. The 1.38 Gbps GigE transmission consists of a continuous flow of fixed size, periodic frames that have the format shown in FIG. 5A wherein FIG. 5A represents two frames with a first frame 512a starting with the two words denoted "H1, H2", and a second frame 512b starts with "H1, H4" or with "H1,H5." This structure is referred below as an "FEC Multiframe", while each separate block of 188 payload words together with the 16 Error check words is referred to below as an "FEC Frame". FIG. 5A also shows the start of a next FEC Multiframe 512c with the "H1, H2." H1 is a 10-bit word which is assigned to the bit-value of a Special Ethernet Code Word. H1 indicates the beginning of an FEC Frame. The chosen value of H1 in the preferred embodiment is one of the standard Ethernet Comma Sequences, denoted /C/ in Ethernet nomenclature, as can be found for example on page 296 of the book "Gigabit Ethernet Networking" by Cunningham and Lane, 1999. The advantage of assigning a /C/ value to the word H1 is two fold. First, the SERDES uses /C/ and the bit-wise logic inverse of /C/ (when each bit is inverted) as a word-delineator for conversion from serial to parallel. Second, the SERDES will delineate frames correctly even if the demodulator produces an inverted bit stream, thus the demodulator can be simpler to implement, allowing the FPGA 300 to determine the actual bit polarity if desired. Each of the H2 and H4 words is also assigned a specific Special Ethernet Code Word, such as the other /C/ sequences, or any other sequence from the so-called /Kx.y/ Special Code Group, as long as H2 is different from H4. The use of two code words "H4" and "H5" as two options in the same frame-position provides a 1-bit signal per frame for the purpose of signaling bit-rate requests to be discussed further below. The sequence H1, H4 indicates that the second frame of data in the FEC Multiframe contains a request for the GigE data rate while the sequence H1,H5 indicates that the second frame of data in the FEC Multiframe contains a request for the FE data rate. Now, the payload structure of the frame is described in more detail.

FIG. 5B illustrates an example of the payload 514 of the frame structure of FIG. 5A. The 188 payload words contain the MAC-level packets and overhead words and the general structure is shown in FIG. 5B. The MAC-level packets contained in the payload are of variable length so that the above payload structure packet boundaries start and end at arbitrary word-positions relative to the 188 words block of the FEC Multiframe and usually span across multiple payload blocks. Any extra space in each 188 word block is filled with random bits. In the payload, before the start of a payload packet, a Special Ethernet Code Word is inserted. The preferred word is /S/=/K27.7/ known as "Start_of packet_delimiter", and at the end of the packet, a Special Ethernet Code Word /T/=/K29.7/ known as "End_of_packet_delimiter" is inserted. Since the air interface does not need to maintain Ethernet compatibility, the choice of these codes is arbitrary, however the use of Special Ethernet words as packet delimiters is advantageous, because the 8B/10B bit transformation ensures that these reserved words never appear inside the packet, and the use of alternating polarities of Special Ethernet Code Words in the /c/ words also helps maintaining zero DC balance.

If there is no Ethernet traffic to transmit, as is the case during Inter Frame Gaps (IFG) periods, the payload field is stuffed with random or pseudo-random bits, generated by a pseudo random sequence generator 504 (shown in FIG. 5C) as 8-bit fictitious data words so that the encoded 8B/10B payload never contains the Ethernet Special code words such as the sequence /S/, which could cause false packet delineation.

Returning to FIG. 5A, the 16 Frame check Sequence words are calculated at the transmit side by a Reed Solomon Encoder 506 (shown in FIG. 5C) using the code structure known as: "RS(204,188) over GF 256". The 138 Mbps transmission (Fast Ethernet at the slower data rate) consists of the same FEC Multiframe format (shown in FIG. 5A) as GigE and the same payload mapping (shown in FIG. 5B), having only the clock rate slowed by a factor of 10. This format includes the 8B/10B transformation discussed above. It should be noted that FE Standard actually specifies a 4B/5B code; however in the proprietary air interface it is beneficial to use the same digital circuits already available for GigE to save logic resources.

The over-the-air bit rate of the communication system includes sufficient overhead beyond the nominal Ethernet bit rate to allow for the overhead words in the FEC Multiframe, the payload mapping, and the potential Ethernet clock mismatch across the link. The air-interface transmit bit rate does not need to be synchronous with the receive rate of the same terminal, unless the radio architecture requires such synchronization, such as the case disclosed in U.S. Pat. No. 6,937,666. For the instant preferred embodiment, the two bit rates are not synchronous; however it is assumed that each bit rate is generated with a precision of a crystal oscillator, compatible with Ethernet specifications.

The generation of the transmit bit stream is performed inside the FPGA 300. The frame structure shown in FIGS. 5A and 5B dictates the implementation of the logic to generate this bit stream. It should be understood that the invention may be implemented with a different frame structure (which would also mean different logic circuit implementations) and those different frame structures and logic circuits are within the scope of the invention.

Figure 5C:
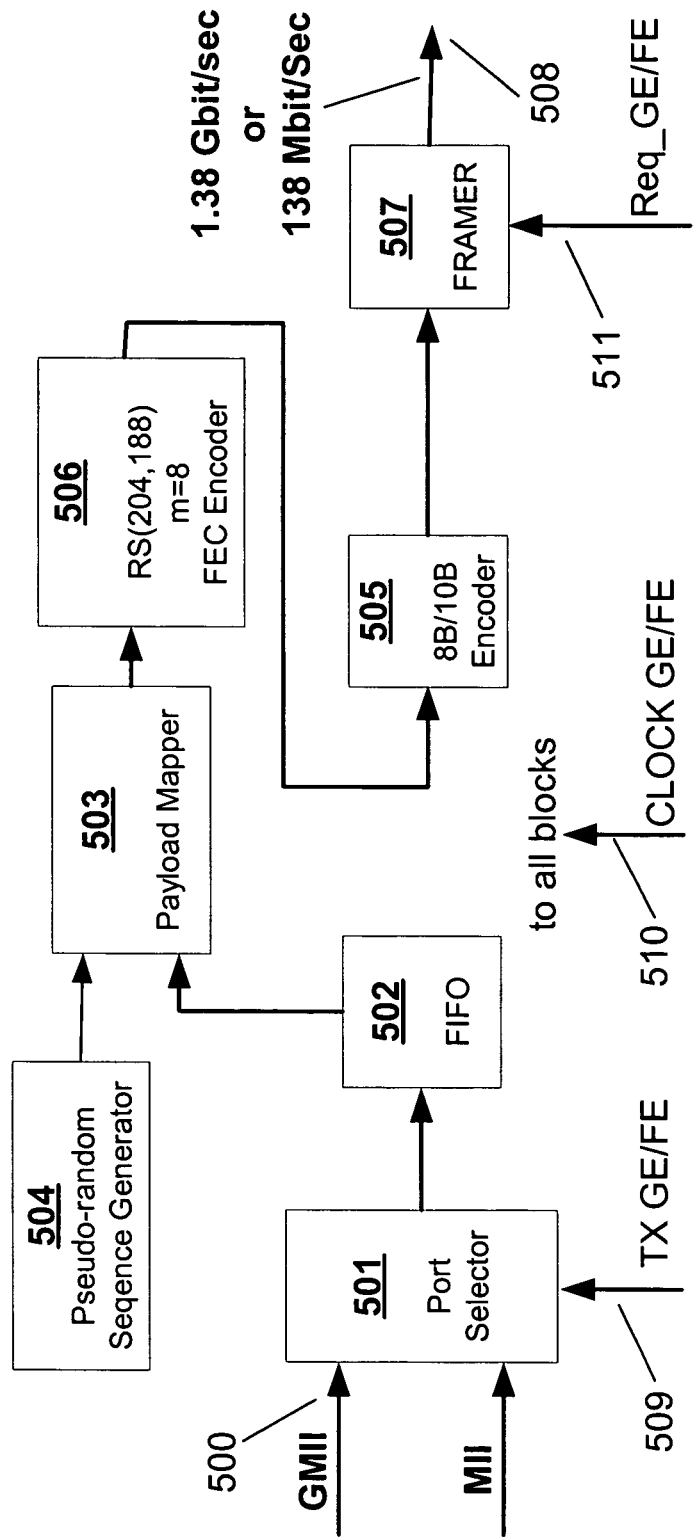
FIG. 5C illustrates an example of an implementation of a set of logic circuits that implement the frame structure shown in FIGS. 5A and 5B.

FIG. 5C illustrates an example of an implementation of a set of logic circuits that implement the frame structure shown in FIGS. 5A and 5B. In a preferred embodiment, these logic circuits are implemented in the FPGA 300 but may also be implemented using discrete integrated circuits which would be within the scope of the invention. As shown, the logic circuits may receive the GMII and MII signals 500 from the Ethernet Switch 303 of FIG. 3 and may select a data rate using a port selector circuit 501 that may be controlled by a "TX GE/FE" signal 509 originating from a circuit configuration memory or directly from a GigE/FE_Req (TX GE/FE) signal 613 in FIG. 6. A clock signal 510 provides the related clock signal at the appropriate speed, either GigE or FE, to the circuits shown in FIG. 5. The rest of the circuits shown in FIG. 5 is identical regardless of the clock rate, thus "FE" mode is merely the GigE circuits running in "slow-motion".

The data from the currently selected port (GMII or MII) at the Selector 501 is sent via a first in first out memory/buffer (FIFO) 502 to a Payload Mapper 503 that performs one or more of the following functions: the temporary storage of the transmitting payload data stream; the indication of when to insert /S/ or /T/ delimiters; the insertion of random bytes from a Pseudo Random Sequence Generator 504 when there is no data to transmit; and the delivery of the resulting payload data to a Reed Solomon Encoder 506. The encoder 506 appends 16 error-check words to the 188 payload words and delivers the payload words and error check words to a encoder 505 wherein the /S/ and /T/ words are generated as 10-bit sequences by the 8B/10B encoder 505 based on an indication from the Payload Mapper 503, which may be passed via the FEC encoder in parallel to the 8-bit payload word as indication bits. The frame with the payload words, check words and /S/ and /T/ words are then fed into a framer circuit 507 that generates the frame structure shown in FIG. 5A and 5B using the payload words, check words and /S/ and /T/ words. While FEC check words are inserted or frame words are transmitted at the port 507, the data flow must be halted and the FIFO 502 provides the temporary storage. Preferably, a depth of approximately 24 bytes is sufficient for the FIFO. The framer 507 adds the "H" characters discussed above and delivers the results to the SERDES 304 of FIG. 3 via an output bus 508.

The framer 507 is informed about the local terminal decision to request a GigE or FE transmission from the opposite terminal by a control signal 511 (Re_GE/FE) that will indicate to the framer 507 whether to transmit "H4" (GigE) or "H5" (FE) frame words in the second FEC Multiframe described above.

In an alternative implementation of the circuits shown in FIG. 5C, the 8B/10B encoder 505 precedes the FEC Encoder 506 so that the FEC encoder encodes the 10-bit words and uses RS(204,188) over GF(1024) which is commercially available in gate array design software. The advantage of this alternative is that even the overhead bits of the 8B/10B encoder output are error-encoded. The disadvantage is that the 10-bit error check words may be outside the 8B/10B code-space and may include long streaks of "1" or "0" beyond the maximum 20 consecutive non-transition bits that a receive SERDES circuit needs to maintain bit-timing synchronization. The preferred embodiment using 8-bit FEC, will be assumed in the rest of this document; however the conversion of the entire terminal for the 10-bit-FEC alternative is disclosed and the circuits can also be implemented using the alternative.

Figure 6:
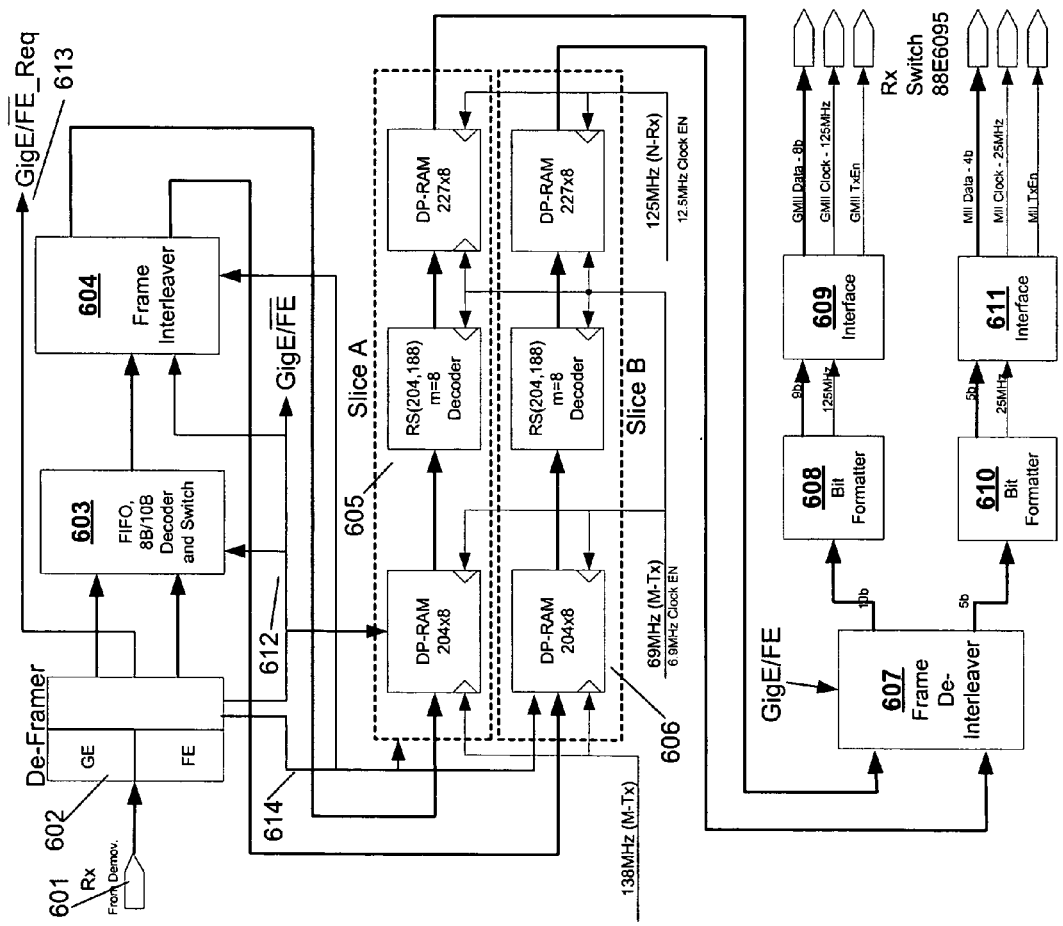
FIG. 6 illustrates an example of the received signal processing of each terminal in FIG. 2.

FIG. 6 illustrates an example of the received signal processing of each terminal. The processing of the received data from the air interface is preferably performed inside the FPGA 300 in FIG. 3 however it could also be performed by discrete circuits. The following description assumes a steady state GigE reception as the FE and data rate transitions are described below with reference to FIGS. 7 and 8. As shown, data words received from the GigE demodulator 412 in FIG. 4 and passed through the SERDES 304 in FIG. 3 arrive at an FPGA port 601 and are processed by a de-framer circuit 602 that synchronizes to the "H1, H2" and/or "H1,H4 or H5" headers for GE and FE, respectively, as discussed above. In the preferred embodiment shown in FIG. 6, the frame synchronization is done before FEC-correction so that a framing algorithm for synchronization and lock maintenance under bit-error conditions should be used, as commonly known from other applications of frame synchronization techniques, such as T1, T3 and SONET. The De-framer 602 obtains GigE-rate (1.38 Gbps) synchronization and outputs a "True" logic value for a GigE/FE signal 612 that indicates to all local circuits that the GigE mode of receiving is currently occurring. The De-framer 602 also generates multi-frame timing signals 614 and, if "H4" is received, a GigE/FE_Req signal 613 is set to "True", recalling that "H4" represents "Second Frame and GigE Request" while "H5" represents "Second Frame and FE Request". This signal 613 is connected to the transmit side, either directly to the signal TX_GE/FE" 509 in FIG. 5, or via a de-bounce circuit that filters short false-requests and the signal indicates the currently used data rate of the system.

The received payload field from the de-framer 602 is transferred to a multi-function block 603 that buffers, switches GigE or FE traffic depending on the current receive indication 612 from the de-framer 602, and decodes the 8B/10B words of the air interface. The buffer function of block 603 is optional, allowing hit-free GigE/FE switching, as discussed later. If a bit-error has occurred in the 10B word over the air, an erroneous byte will be decoded by the block 603. However a following FEC Decoder can correct most of these errors. The output from block 603 is separated into two alternating frames (the first and second frames of the Multiblock FEC) by a frame interleaver 604, that sends an FEC-Frame to a set of Slice A circuitry 605 and the next FEC-Frame to a set of Slice B circuitry 606 repeatedly so that the incoming data is split into the two frames. Each set of circuitry 605, 606 includes a Reed-Solomon Decoder 605a, 606a compatible with the transmit FEC overhead and a first dual port RAM 605b, 606b and a second dual port RAM 605$_{-i\ c}$, 606c wherein the RAMs are clocked by the clocks shown in FIG. 6. The Reed-Solomon decoders 605a, 606a in each slice are surrounded by dual-port RAM blocks acting as temporary storage while data is processed and errors are corrected. The use of multiple slices in parallel is necessary when the FPGA processing speed is insufficient to handle the entire received throughput in real time with a single slice. The two decoded and error corrected frames are then combined by a frame de-interleaver circuit 607, which also includes payload processing to reject filled gaps and their associated /S/ and /T/ words and deliver pure MAC packets to an 8B/10B Decoder 608 and an interface 609 to the GMII port in the Ethernet Switch 303 of FIG. 3. For an FE data rate, the frame de-interleaver 607 outputs signals (5b) to a bit formatter 610 (8B/10B Decoder) which outputs data to an interface 611 to the MII port in the Ethernet Switch 303 of FIG. 3. The clock rates shown in each dual port RAM are for illustration purpose and may have different nominal values in a particular design.

While the Reed-Solomon decoder 605a, 606a corrects errors, error statistics are collected in special counters within each decoder and the pre-correction error count provides a raw link performance estimate. For a given system and link design, two error-ratio levels are of interest. One will be called "High Performance Threshold" (HPT), for example, an estimated bit error ratio (BER)=0.0001, and one is a "Low Performance Threshold" (LPT), for example an estimated BER=0.001. Both thresholds are chosen so that the corrected BER past the Reed Solomon decoder is acceptable for the application, usually below 10E-9 or even 10E-12.

The bit errors in the radio link may cause the SERDES 304 in FIG. 3 to lose synchronization as a false Ethernet comma /C/ is falsely received, or if a real comma /C/ containing an error is skipped. The loss of one comma might cause a loss of a whole Ethernet packet. To minimize the chance of such losses, the de-Framer 602 inside of the FPGA 300 sends a signal 316 to the SERDES 304 while the De-Framer 602 is locked, causing the SERDES 304 to pass all 10-bit words transparently without attempt to re-synchronize word boundaries.

The reception of FE transmissions occur in a similar manner to the GigE process described above. In particular, the FE transmissions are demodulated by the demodulator 414 in FIG. 4 and are delivered via the CDR 309 in FIG. 3 directly to the FPGA 300 as shown in FIG. 3, without the external SERDES 304, which is not required at this lower bit rate. Instead, all decoding and synchronization functions are performed in the de-framer 602 that is part of the FPGA 300 in the preferred embodiment. If a steady-state FE reception is active, the FE-portion of the de-framer 602 is used and the Frame interleaver 604 is not interleaving, thus only the Slice A circuits 605 are in use. A Bit Formatter 610 breaks each 8-bit word into two 4-bit slices for the interface 611 and the following MII interface with the Ethernet Switch.

When the opposite side of the link changes bit rate, the de-framer 601 loses framing of the current signal and obtains framing of the other rate. This causes the De-Framer 601 to invert the GigE/FE signal 612 and each block assumes the new processing rate. To minimize the chance of losing data while receive rate-switching occurs, the FIFO function of block 603 is provided along with the port switching function in the same unit 603. The transition from one bit-rate to the other is a process involving a coordinated activity in both terminals. The preferred embodiment uses a symmetrical approach in which each terminal decides what bit rate it is capable of receiving and instructs the opposite side to transmit this rate. It is possible that each terminal transmits at a different bit rate until both sides of the link have resumed GigE communications or both sides defaulted to FE communications.

The measurement of the receive performance is done using a receive signal level (RSL) estimation and a receive bit error ratio (BER) estimation or a combination of both. A power meter 416 in FIG. 4, provides a signal estimating the local Receive Signal Level (RSL) to the terminal controller 415. The power meter may be a diode-detector circuit with a low-pass filter and an A/D converter. A temperature calibration shown in FIG. 4 allows accuracy within a few dB.

An additional receive performance measurement is a BER estimate. The BER during GigE reception was discussed above in conjunction with the Reed Solomon decoders in FIG. 6, and performance thresholds HPT and LPT were defined. When FE is received, it is desirable to monitor the expected GigE uncorrected-BER before switching to GigE, thus switching occurs only when the GigE link performance is satisfactory. A Bit Error Monitor 310 in FIG. 3 performs this function as will now be described in more detail. The monitor 310 can be implemented inside the FPGA 300 and is drawn outside the FPGA for illustration purpose only in FIG. 3.

Figure 7:
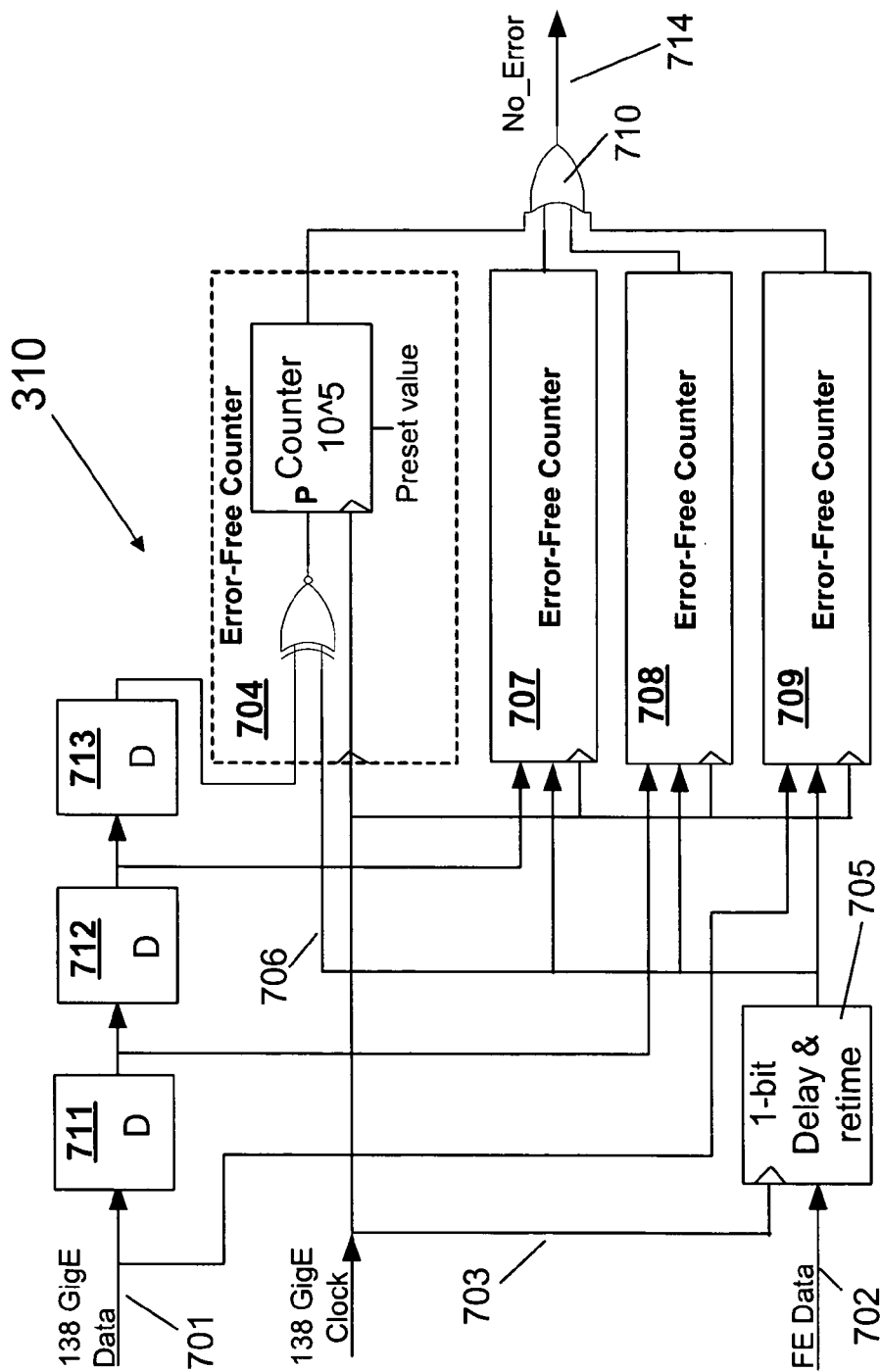
FIG. 7 illustrates an example of the circuitry that may be used to implement the bit rate monitor of the terminal shown in FIG. 3.

FIG. 7 illustrates an example of the circuitry that may be used to implement the bit rate monitor 310. The serial bit stream from the FE channel 315 in FIG. 3, called "FE_DATA" 702 in FIG. 7, is compared with the output of the parallel GigE demodulator, now receiving the FE-speed traffic at 138 Mbps through an IF bandwidth suitable for GigE, approximately 1.5 GHz for QPSK modulation. Because of lower signal to noise ratio in the GigE channel, the GigE data 701 has a higher BER than the FE_Data 702. To monitor when link performance is suitable for GigE while receiving FE, the two data streams are compared, assuming that at a SNR suitable for GigE, the SNR in the FE channel is about 10dB better and the BER is much lower, thus the bit-by-bit comparison of the two streams 701 and 702 is an effective indication of the uncorrected-BER expected under GigE operation.

While the comparison is simply an XNOR gate, outputting a logic "1" when the two inputs disagree, there is an uncertainty of the relative bit timing of the two channels due to the combined effect of the demodulators delays and the CDR circuits discussed above. The circuit in FIG. 7 illustrates how this uncertainty is overcome. Since it is not known which data 702 or 701 arrives first, the FE_Data 702 is delayed 1 bit time and is re-timed by a D-flip flop 705 clocked by the GigE recovered clock 703. For comparison, the GigE signal 701 is delayed by successive delay lines 711, 712 and 713 of approximately D=1/3 bit-time each, and all four phases of the signal 701 are compared (by a set of error free counters 704, 707, 708, 709) with a delayed FE signal 706. For example, one comparison is performed by the "Error-Free Counter" section 704, which is preset to a Preset-value (for example zero), when an XNOR gate in the error free counter 704 outputs a "1" during the clock 706 rise time. If N=(10E+5)-Preset-value consecutive bits are error-free in both channels, the counter overflows and an OR gate 710 will output a "1" at the port 714, indicating that the section 704 has operated for N consecutive bits without error, thus 1/N is an estimate of uncorrected BER. The OR gate 710 will allow any of the four segments to cause a No-error output 714. The actual number of delay lines and the number of bits for delay re-time are a function of a particular receiver design and are an obvious scaling of the approach described above.

The No-Error signal 714 can be latched by a D-flip flop for automatic GigE requesting from the opposite terminal, or the system Controller 415 in FIG. 4 can read this indication and set the GigE request based on the combined latched-No-Error signal and acceptable level of RSL. For example: "Request GigE" is enabled if No-Error=1 AND RSL>−50 dBm. The system controller 415 may therefore include firmware code that implements this logic. While the controller-based switching is slower, the changes in RSL due to rain fade are relatively slow, normally longer than 100 milliseconds. The BER status can change in a few microseconds. To obtain some microseconds of switching, the Controller 415 can set a flip-flop inside the FPGA 300 as an indication of an acceptable RSL and now a simple AND logic gate can combine RSL and No-Error to be latched for the above GigE request generation.

In the above discussions, the GigE Reception Quality thresholds HPT and LPT were functions of BER and RSL. In another preferred embodiment, a third parameter is added; packet loss ratio (PLR). The switch 303 in FIG. 3 rejects and counts the number of invalid packets received at the GMII port 311. Most commercial switches keep a count of the rejected packets in a built-in register. Another register keeps a total count of frames received. Both of these registers can be cleared by external device, such as a microprocessor so that the Processor 415 can read and clear these registers periodically. The processor then estimates the current PLR by dividing the count of rejected packets by the count of total packets. Some switches may keep registers with different types of count, such as "rejected packets" and "accepted packets", thus the estimation algorithm of PLR may be modified accordingly and those modifications are within the scope of the invention. In this preferred embodiment, the HPT and LPT are functions of BER, RSL and PLR or any subset of these three parameters. These threshold functions may be set by the user via the network management system. Applications sensitive to any errors will tend to prefer an algorithm dominant by BER estimate, while applications that can tolerate some packet losses may prefer PLR as the dominant parameter, for example, PLR=0.1 as the LPT, and PLR=0.01 as the HPT. By setting a relatively poor PLR, such as 0.1, the user gains more availability of the high speed link. While a similar increased high-speed availability can be accomplished by lowering the GigE Reception Quality thresholds based on FEC and/or RSL, the end user may know better the acceptable PLR for a given application and therefore may allow more relaxed link performance, thus gain more availability.

Figure 8:
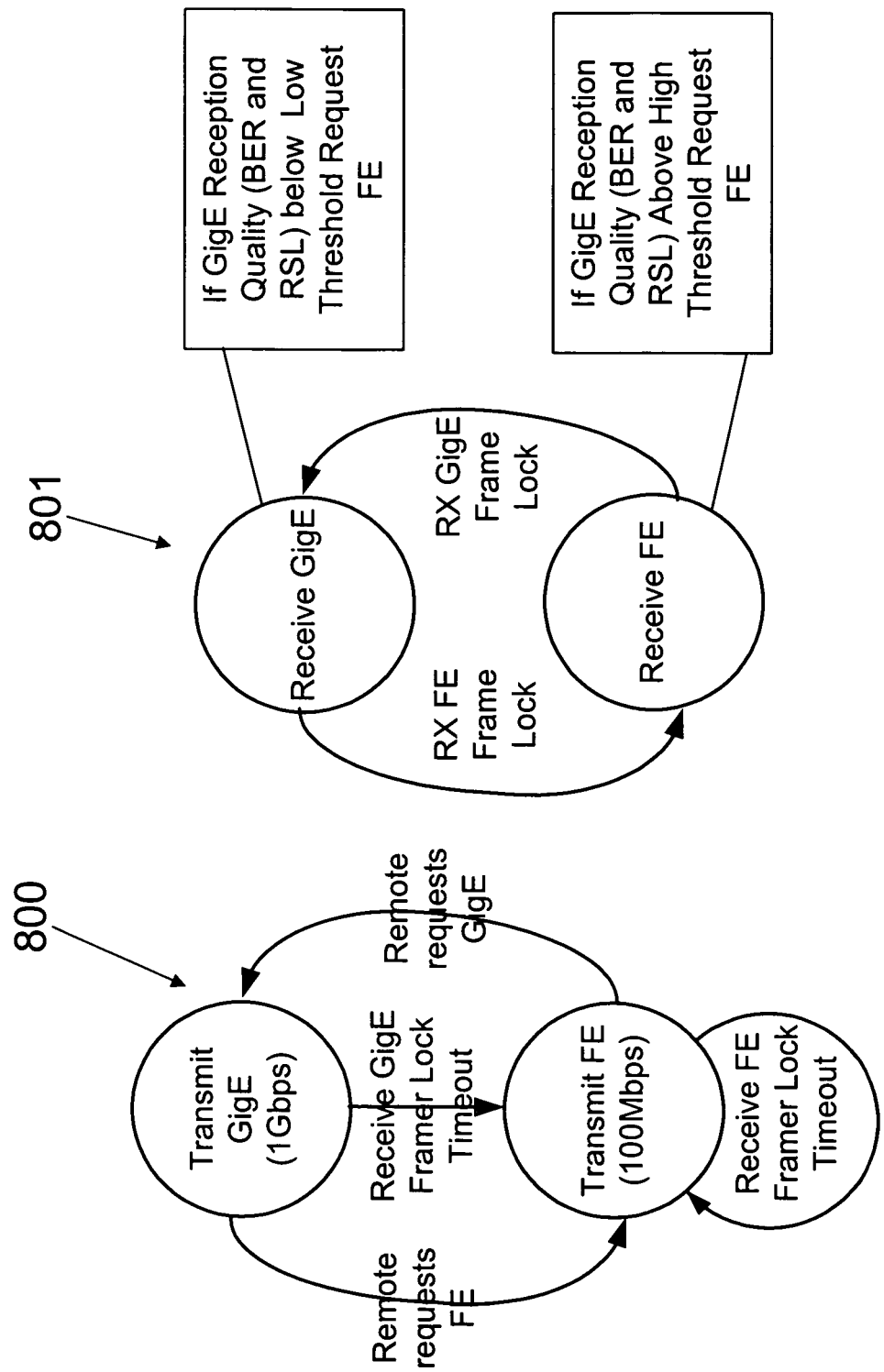
FIG. 8 illustrates an example of a terminal-level state diagram for performing the entire switching operation.

FIG. 8 illustrates an example of a terminal-level state diagram for performing the entire switching operation. While only one terminal is described, the opposite terminal performs the same processes with the same state machines, thus the symmetrical nature of these processes. In the preferred embodiment, the state machine logic shown in FIG. 8 is implemented by firmware executed by the system controllers 415 of the respective terminals. FIG. 8 illustrates a set of transmit states 800 and a set of receive states 801. The transmit state is determined by the rate requested by the remote side, via the framing structure discussed above. Only in the event of loss of framing that exceeds a timeout period, such as 1 second, the transmission defaults to FE, which has a better chance of establishing communications during a fade condition.

The receive status is determined by the De-framer which is currently locked. Even if communication is lost, both GigE and FE de-framers attempt to lock in parallel. If an implemented terminal's circuit resources do not allow parallel frame checking at both rates, the receiver can alternate between each mode (GigE/FE) periodically every few milliseconds until frame lock is found in one of the two rates and then remains at that rate and follow the state machine process.

The decision of what bit rate to request is based on the performance thresholds HPT and LPT discussed above. While receiving FE, only if HPT is reached, GigE is requested. When receiving GigE, performance below LPT causes sending an FE request.

After a rate changes in a receiver, the Ethernet port in the Ethernet Switch 303 starts receiving data in at the appropriate port, 311 or 313. The Switch 303 needs to inform the end equipment connected to a port 301 to modify the data throughput accordingly, for example, to run FE-rate over a GigE fiber optics connection. This rate change is performed automatically in the switch 303 using established Ethernet VLAN protocols. This rate switching configuration can be assisted by the system controller 415.

While the foregoing has been with reference to a particular embodiment of the invention, it will be appreciated by those skilled in the art that changes in this embodiment may be made without departing from the principles and spirit of the invention, the scope of which is defined by the appended claims.

The invention claimed is:

1. A rate-adapting microwave communication link, comprising:
   a first ground based microwave terminal that is capable of transmitting a signal at one of a first data rate and a second data rate, wherein the first data rate is at least 1 gigabit/second and the second data rate that is less than 1 gigabit/second;
   a second ground based microwave terminal that is capable of transmitting a signal at one of a first data rate and a second data rate, wherein the first data rate is at least 1 gigabit/second and the second data rate that is less than 1 gigabit/second;
   wherein the first ground based microwave terminal further comprises a receive performance-level monitoring circuit that generates a signal indicating a performance level of a received signal from the second ground based microwave terminal, a logic circuit coupled to the receive performance-level estimation circuit that compares the performance level to a threshold level and a circuit that generates a signal to request a transmit rate change in the second ground based microwave terminal based on the comparison of the performance level and the threshold level; and
   wherein the second ground based microwave terminal further comprises a receive performance-level monitoring circuit that generates a signal indicating a performance level of a received signal from the first ground based microwave terminal, a logic circuit coupled to the receive performance-level estimation circuit that compares the performance level to a threshold level and a circuit that generates a signal to request a transmit rate change in the first ground based microwave terminal based on the comparison of the performance level and the threshold level.

2. The link of claim 1, wherein the circuit that generates a signal to request a transmit rate change further comprises a circuit that requests a rate increase when the performance level exceeds the threshold level.

3. The link of claim 2, wherein the threshold level is a predetermined received signal level that is greater than a predetermined value.

4. The link of claim 1, wherein the receive performance-level monitoring circuit further comprises at least two demodulators operating in parallel wherein at least one demodulator operates properly at the first data rate and at least one demodulator operates properly at the second data rate wherein the first data rate is higher than the second data rate.

5. The link of claim 4, wherein the first data rate further comprises an Gigabit Ethernet data rate and the second data rate further comprises a Fast Ethernet data rate.

6. The link of claim 4, wherein receive performance-level monitoring circuit further comprises a circuit that compares a bitstream at the first data rate with a bitstream at the second data rate to determine the performance level of the received signal from the second microwave terminal.

7. The link of claim 1, wherein the logic circuit coupled to the receive performance-level estimation circuit further comprises a circuit that measures a bit error ratio of the received signal, a circuit that measures a receive signal level and a circuit that generates the threshold level based on the bit error ratio and the receive signal level.

8. The link of claim 7, wherein the logic circuit coupled to the receive performance-level estimation circuit further comprises a circuit that determines a packet loss ratio of the received bitstream and wherein the circuit that generates the threshold level further comprises a circuit that generates the threshold level based on one or more of the bit error ratio, the receive signal level and the packet loss ratio.

9. The link of claim 1, wherein the first microwave terminal further comprises a circuit that embeds the transmit rate change request signal into a signal transmitted from the first microwave terminal to the second microwave terminal.

10. A method for communicating Ethernet data between a first microwave terminal and a second microwave terminal over a microwave link, the method comprising:
   receiving a digital data signal having a particular data rate;
   switching, within an Ethernet switch in the first microwave terminal, the digital data signal to a transmission link path;
   generating a transmission bitstream from the digital data signal, the transmission bitstream having one or more special Ethernet code words embedded into the bitstream;
   generating a modulated signal at a dual rate modulator based on the particular data rate of the digital data signal; and
   sending a microwave signal containing the modulated signal over a microwave link to the second microwave terminal.

11. The method of claim 10, wherein generating a transmission bitstream from the digital data signal further comprises generating a serial bitstream at the particular data rate and generating a parallel bitstream at the particular data rate based on the serial bitstream.

12. The method of claim 10, wherein generating a transmission bitstream from the digital data signal further comprises inserting the special Ethernet code words into the transmission bitstream wherein the special Ethernet code words are at least one of a set of comma /C/ sequences.

13. The method of claim 12, wherein inserting the special Ethernet code words into the transmission bitstream further comprises delimiting one of a start and an end of a frame in the transmitted bitstream using the special Ethernet code words.

14. The method of claim 13, wherein generating a transmission bitstream from the digital data signal further comprises generating a multiframe format having a first frame and a second frame between the special Ethernet code words wherein the first and second frames each further comprise a payload portion and an error check sequence portion.

15. The method of claim 14, wherein generating the multiframe format further comprising generating a data rate change parameter wherein the data rate change parameter indicates a request by the first microwave terminal to change the data rate between a first data rate and a second data rate.

16. The method of claim 10 further comprising receiving a microwave signal from the second microwave terminal and generating a received digital data signal at a received data rate from the received microwave signal.

17. The method of claim 16, wherein generating a received digital data signal at a received data rate from the received microwave signal further comprises generating a demodulated signal from the received microwave signal, generating a received bitstream based on the demodulated signal wherein the received bitstream has one or more special Ethernet code words embedded into the received bitstream, converting the received bitstream into a digital received data signal and switching, within an Ethernet switch in the first microwave terminal, the received digital data signal to an Ethernet physical link at the received data rate.

18. The method of claim 17, wherein generating a demodulated signal from the received microwave signal further comprises generating a first demodulated signal at a first data rate and generating a second demodulated signal at a second data rate.

19. The method of claim 18, wherein generating a received bitstream based on the demodulated signal further comprises recovering a clock signal from the received microwave signal based on the first and second demodulated signals.

20. The method of claim 18, wherein generating a received bitstream based on the demodulated signal further comprises determining a bit rate error of the received microwave signal based on the first and second demodulated signals.

21. The method of claim 17, wherein converting the received bitstream into a digital received data signal further comprises removing special Ethernet code words from the received bitstream wherein the special Ethernet code words are at least one of a set of comma /C/ sequences.

22. The method of claim 21, wherein removing the special Ethernet code words further comprises recovering a first frame of received digital data located between the special Ethernet code words in the received bitstream and recovering a second frame of receive digital data located between the special Ethernet code words in the received bitstream.

23. The method of claim 17, wherein converting the received bitstream into a digital received data signal further comprises recovering a data rate change parameter from the received bitstream wherein the data rate change parameter indicates a request by the second microwave terminal to change the data rate between a first data rate and a second data rate.

24. A process of changing the transmit rate in a microwave link between a first ground based microwave terminal and a second ground based microwave terminal wherein the first and second microwave terminals are capable of transmitting a microwave signal at one of a first data rate and a second data rate, the method comprising:
   generating, at the first ground based microwave terminal, a received bitstream from a microwave signal received by the first ground based microwave terminal;
   generating, at the second ground based microwave terminal, a received bitstream from a microwave signal received by the second ground based microwave terminal;
   monitoring the received bitstream in order to generate a signal indicating a performance level of the received microwave signal from one of the second ground based microwave terminal and the first ground based microwave terminal;
   comparing the performance level of the received microwave signal to a threshold level; and
   generating, in one of the second ground based microwave terminal and the first ground based microwave terminal, a rate change request signal that requests a data rate change for the microwave link between the first and second data rates, wherein the first data rate is at least 1 gigabit/second and the second data rate that is less than 1 gigabit/second.

25. The method of claim 24, wherein generating the rate change request signal further comprises requesting an increase in the data rate of the microwave link when the performance level exceeds the threshold level.

26. The method of claim 25, wherein the threshold level is a predetermined received signal level that is greater than a predetermined value.

27. The method of claim 24, wherein generating the received bitstream further comprising demodulating, in parallel, the received bitstream at the first data rate and the second data rate wherein the first data rate is higher than the second data rate.

28. The method of claim 27, wherein the first data rate is at least 1 gigabit/second and the second data rate that is less than 1 gigabit/second.

29. The method of claim 28, wherein the first data rate further comprises an Gigabit Ethernet data rate and the second data rate further comprises a Fast Ethernet data rate.

30. The method of claim 27, wherein generating the received bitstream further comprises comparing the bitstream at the first data rate with the bitstream at the second data rate to determine the performance level of the received signal from the second microwave terminal.

31. The method of claim 24, wherein monitoring the received bitstream further comprises measuring at least one of a bit rate error of the received bitstream and a receive signal level of the received microwave signal and generating the threshold level based on the bit error ratio and the receive signal level.

32. The method of claim 31, wherein monitoring the received bitstream further comprises measuring a packet loss ratio of the received bitstream and wherein generating the threshold level further comprises generating the threshold level based on one or more of the bit error ratio, the receive signal level and the packet loss ratio.

33. The method of claim 24 further comprising embedding the rate change request signal into a signal transmitted from the first microwave terminal to the second microwave terminal in order to change the data rate of the microwave link between the first and second data rates.

* * * * *